(12) United States Patent
Mizuta et al.

(10) Patent No.: US 7,376,449 B2
(45) Date of Patent: May 20, 2008

(54) SLIDE-TYPE PORTABLE COMMUNICATION APPARATUS

(75) Inventors: Masatomo Mizuta, Tokyo (JP); Kazuo Ohtsuta, Tokyo (JP); Kiyoshi Kohayakawa, Tokyo (JP); Michio Nagai, Tokyo (JP); Mika Fujii, Tokyo (JP); Masaki Shimamura, Tokyo (JP)

(73) Assignee: NEC Corporation, Tokyo (JP)

( * ) Notice: Subject to any disclaimer, the term of this patent is extended or adjusted under 35 U.S.C. 154(b) by 597 days.

(21) Appl. No.: 10/261,955

(22) Filed: Oct. 2, 2002

(65) Prior Publication Data

US 2003/0064688 A1 Apr. 3, 2003

(30) Foreign Application Priority Data

Oct. 3, 2001 (JP) ............................. 2001-308015
Jul. 19, 2002 (JP) ............................. 2002-210523

(51) Int. Cl.
*H04M 1/00* (2006.01)
*H04B 1/38* (2006.01)

(52) U.S. Cl. ............... 455/575.3; 455/90.3; 455/525.1; 455/525.4

(58) Field of Classification Search ............... 455/90.3, 455/575.1, 575.3, 575.4, 575.8, 550.1; 379/428–433, 379/433.12, 433.13
See application file for complete search history.

(56) References Cited

U.S. PATENT DOCUMENTS

| | | | |
|---|---|---|---|
| 5,956,625 A * | 9/1999 | Hansen et al. ............ 455/575.4 |
| 6,009,338 A * | 12/1999 | Iwata et al. ............... 455/575.4 |
| 6,064,734 A | 5/2000 | Hasegawa et al. |
| 6,073,027 A | 6/2000 | Norman et al. |
| 6,157,718 A * | 12/2000 | Kaschke ................... 455/569.1 |
| 6,249,672 B1 * | 6/2001 | Castiel ..................... 455/575.4 |
| 6,308,084 B1 | 10/2001 | Lonka |
| 6,370,362 B1 * | 4/2002 | Hansen et al. ............. 455/90.1 |

(Continued)

FOREIGN PATENT DOCUMENTS

CN 1238629 A 12/1999

(Continued)

OTHER PUBLICATIONS

English Translation of the Chinese Office Action dated Jun. 11, 2004.

(Continued)

*Primary Examiner*—Pablo N. Tran
(74) *Attorney, Agent, or Firm*—McGinn IP Law Group, PLLC

(57) ABSTRACT

A portable communication apparatus includes a first unit having at least a display section and a second unit having at least a main operation section, which are coupled by a slide coupling and are freely slidable in a longitudinal direction between a retracted state and an extended state. The first unit and the second unit are urged by an urging member in an extension direction and are releasably locked by a releasable lock mechanism in the retracted state. The locking is released by a predetermined operation. An optical aperture for optical function is provided in one of surfaces of the first and second units that face one another in the retracted state. The optical function section is made operable when the first and second units are positioned in the extended state.

32 Claims, 13 Drawing Sheets

U.S. PATENT DOCUMENTS

| | | | |
|---|---|---|---|
| 6,397,078 B1 * | 5/2002 | Kim | 455/556.2 |
| 6,400,967 B1 * | 6/2002 | Nilsson | 455/563 |
| 6,510,325 B1 * | 1/2003 | Mack et al. | 455/575.2 |
| D479,516 S * | 9/2003 | Bricaud et al. | D14/138 |
| D481,692 S * | 11/2003 | Husgafvel | D14/138 |
| 6,748,249 B1 * | 6/2004 | Eromaki et al. | 455/575.4 |
| D493,156 S * | 7/2004 | Hamann et al. | D14/138 |
| D495,324 S * | 8/2004 | Husgafvel | D14/248 |
| 6,816,363 B2 * | 11/2004 | Yamamoto | 361/681 |
| 6,822,871 B2 * | 11/2004 | Lee et al. | 361/727 |
| D502,454 S * | 3/2005 | Lee | D14/138 |
| 6,934,568 B2 * | 8/2005 | Charlier et al. | 455/575.3 |
| 6,968,161 B2 * | 11/2005 | Inomata et al. | 455/90.3 |
| 6,973,186 B2 * | 12/2005 | Shin | 379/433.12 |
| 2001/0005179 A1 * | 6/2001 | Hutchison | 343/763 |
| 2001/0009847 A1 * | 7/2001 | Kim et al. | 455/90 |
| 2002/0137476 A1 * | 9/2002 | Shin | 455/90 |
| 2004/0067784 A1 * | 4/2004 | Kubo et al. | 455/575.4 |
| 2005/0272488 A1 * | 12/2005 | Zou | 455/575.4 |

FOREIGN PATENT DOCUMENTS

| | | |
|---|---|---|
| CN | 1296352 A | 5/2001 |
| DE | 297 22 657 U1 | 12/1997 |
| EP | 1 051 012 A2 | 11/2000 |
| EP | 1 143 686 A1 | 10/2001 |
| GB | 2 235 606 A | 3/1991 |
| JP | S60-121357 | 6/1985 |
| JP | H3-70445 | 3/1991 |
| JP | H5-46742 | 2/1993 |
| JP | H8-186517 | 7/1996 |
| JP | H9-106386 | 4/1997 |
| JP | H9-186752 | 7/1997 |
| JP | H10-108152 | 4/1998 |
| JP | H10-190795 | 7/1998 |
| JP | 10-271192 | 10/1998 |
| JP | H11-344752 | 12/1999 |
| JP | 2000-78254 | 3/2000 |
| JP | 2000-332871 | 11/2000 |
| JP | 2001-60994 | 3/2001 |
| JP | 2001-243441 | 9/2001 |
| WO | WO 01/45283 A1 | 6/2001 |

OTHER PUBLICATIONS

United Kingdom Search Report dated Jan. 9, 2004.
United Kingdom Combined Search and Examination Report dated Mar. 5, 2003.
Japanese Office Action dated Jun. 12, 2007, with partial English translation.

* cited by examiner

FIG. 1A
FIG. 1B
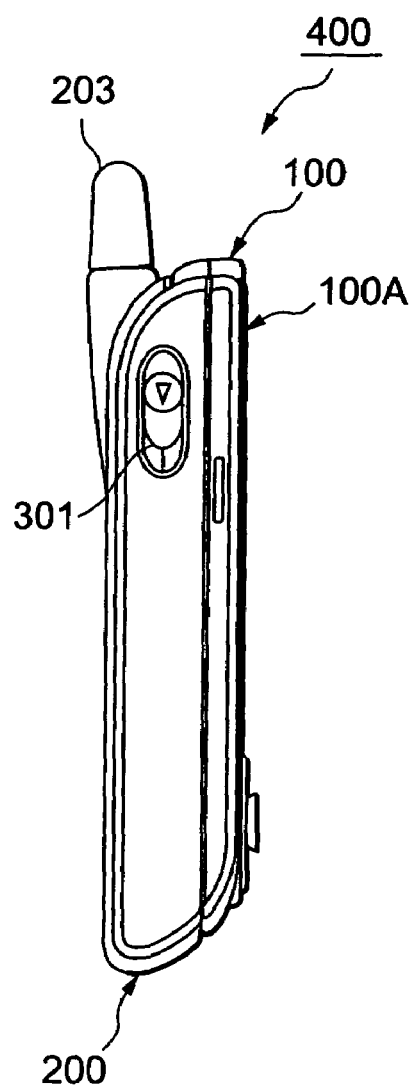
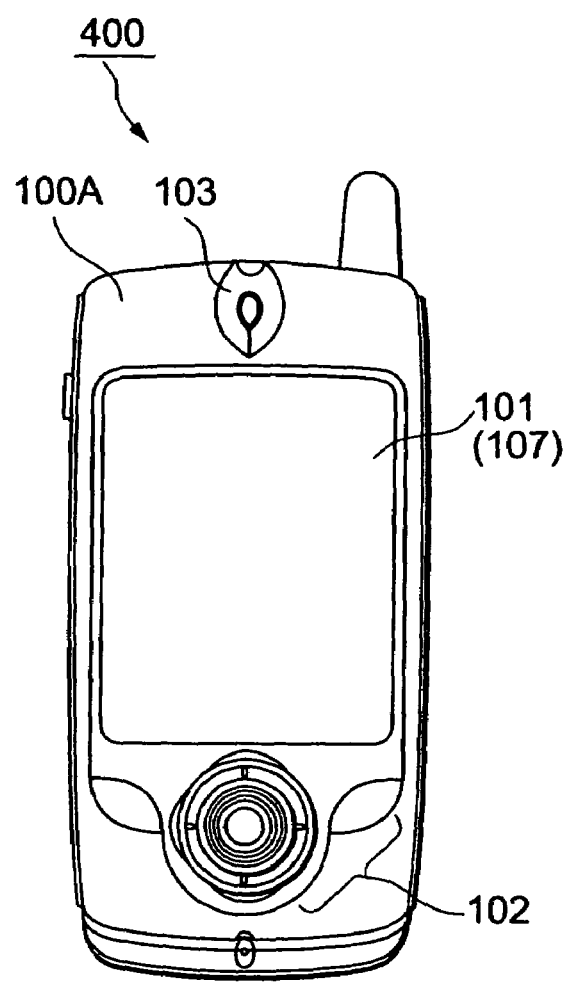

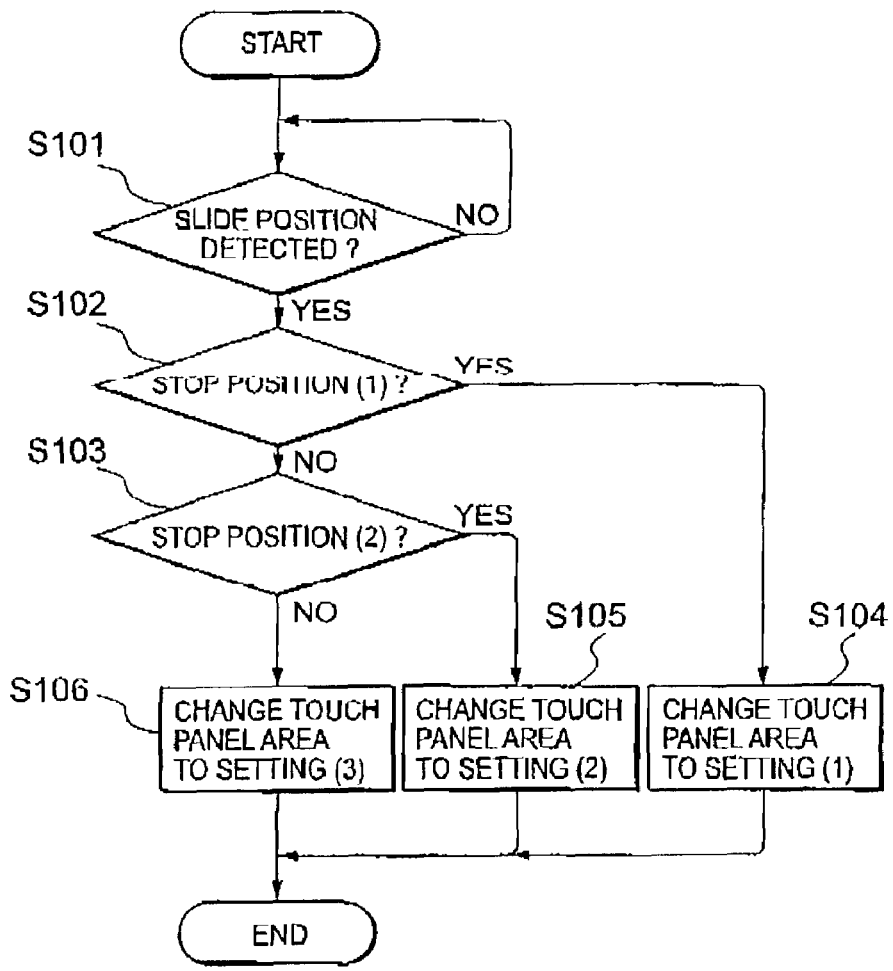

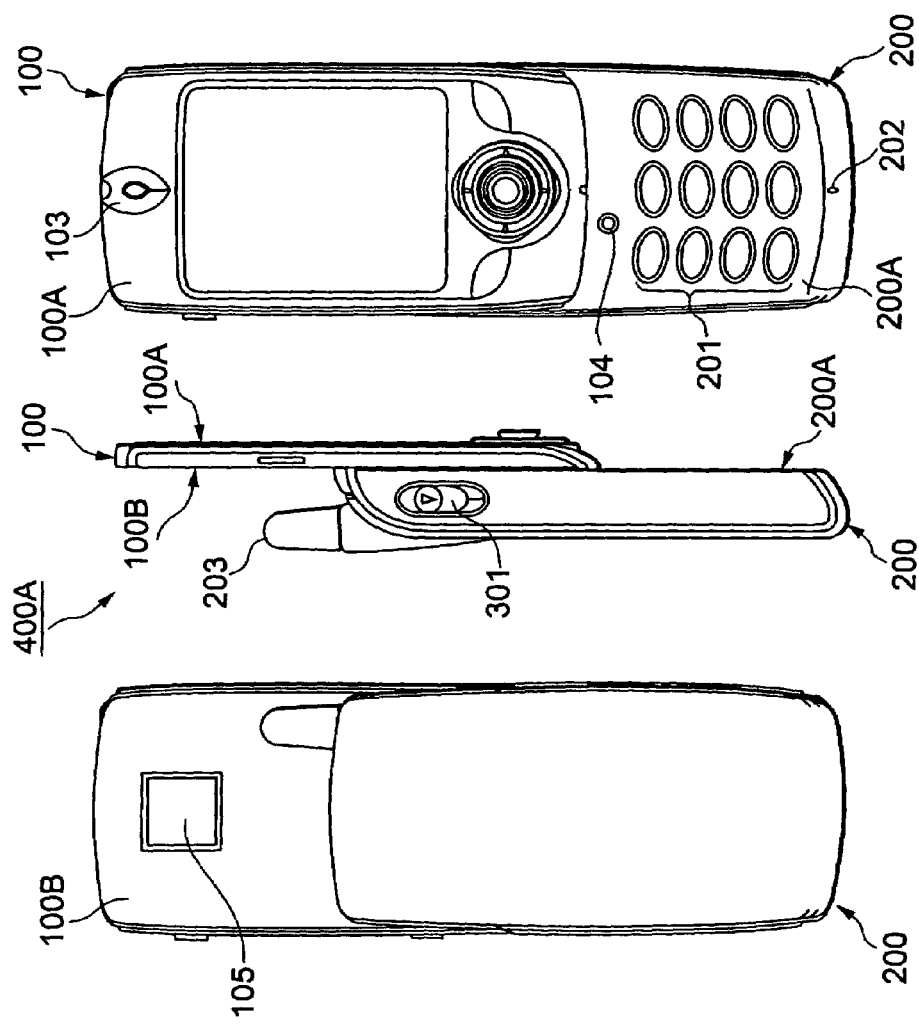

FIG. 9A FIG. 9B FIG. 9C
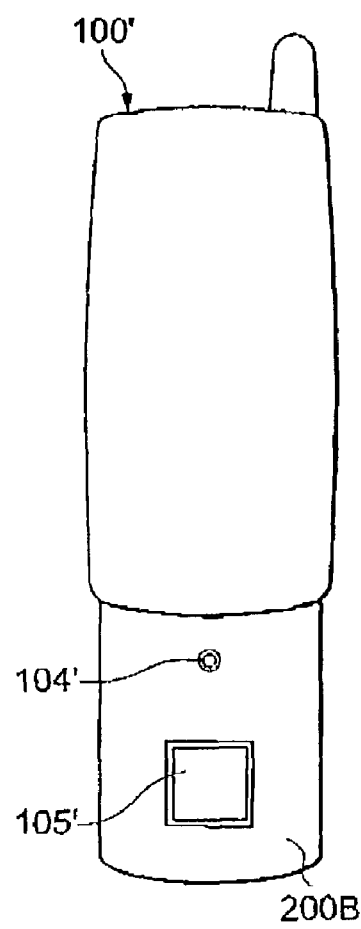
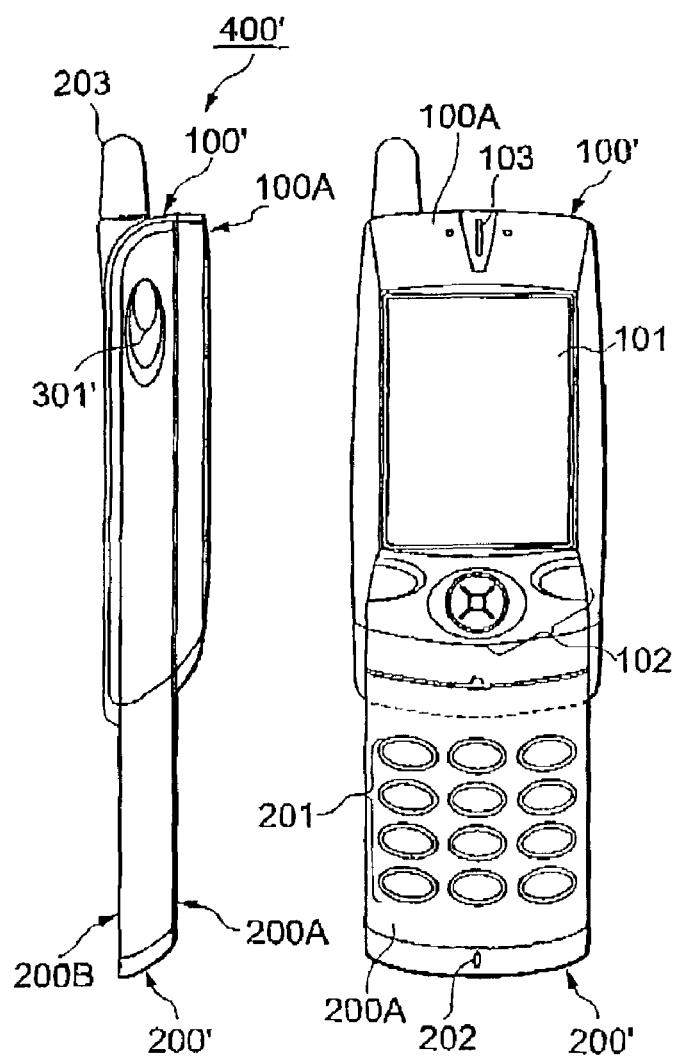

FIG. 10A
FIG. 10B
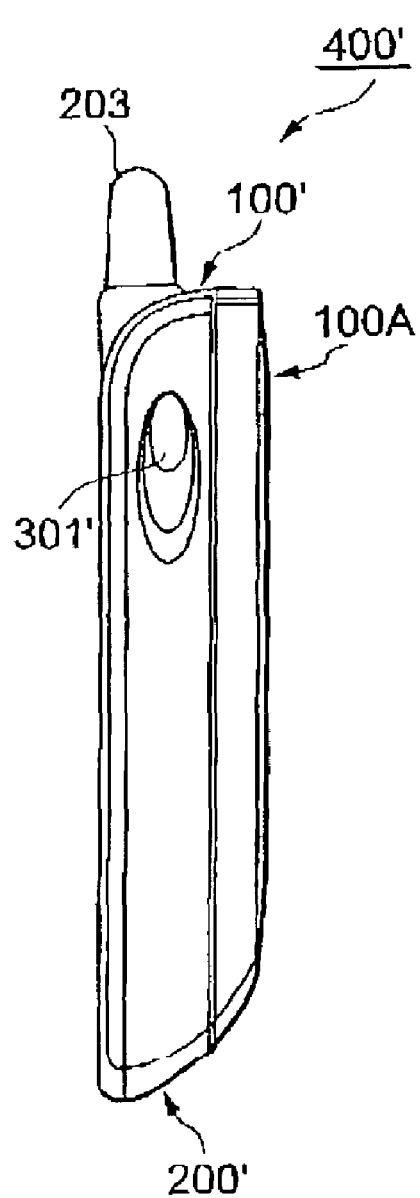
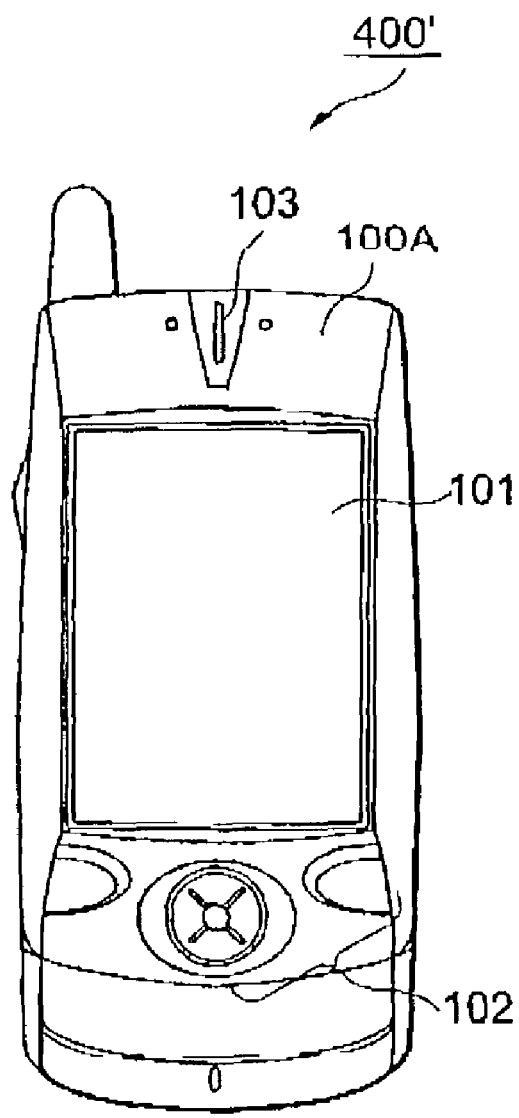

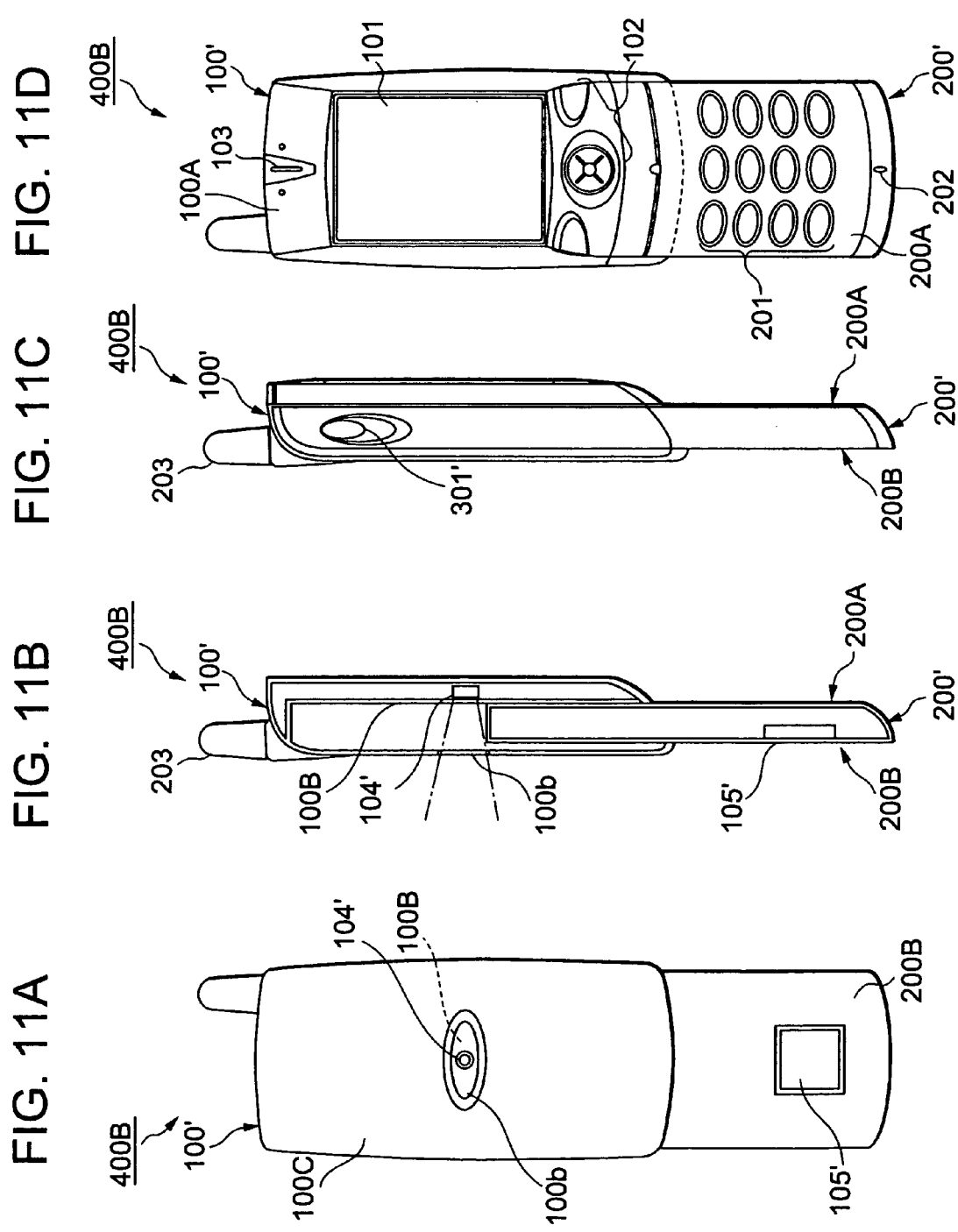

SLIDE-TYPE PORTABLE COMMUNICATION APPARATUS

BACKGROUND OF THE INVENTION

1. Field of the Invention

The present invention relates to a portable communication apparatus such as a portable telephone, and more particularly, to a portable communication apparatus having a slide-type structure provided with unprecedented functions to improve the convenience in use.

2. Description of the Related Art

In addition to a straight-type portable telephone apparatus, foldable or slidable structures have been employed to meet the needs for miniaturization. The foldable structure allows two units of a main body to be folded by a connecting member rotatably connecting the two units. The slidable structure is provided with a main housing (first unit) and a movable housing (second unit), which is mounted with a part of functions and is coupled with the main housing so as to be slidable in the longitudinal direction. Such a structure allows the two units to be retracted with overlapping one another when carried and to be extended by sliding them in the longitudinal direction when communicating or the like.

For example, Japanese Unexamined Patent Application Publication No. 5-91015 discloses a small-size portable radio apparatus, which comprises a housing that has a transmitter, a key operation section and a display section and has a recess portion formed extending in the longitudinal direction, and a movable housing that is equipped with a receiver and incorporated into the recess portion so as to be freely slidable. When being out of use, the movable housing can be inserted into the recess portion to compact the entire; and the movable housing can be pulled out to a desired length to be used.

Also, Japanese Unexamined Patent Application Publication No. 7-312631 discloses a portable radio apparatus, which comprises a first housing having at least a receiver and a display section, and a second housing, which is accommodated within the first housing so as to be freely slidable and rotatable with respect to the first housing and is provided with an operation section and a transmitter on the front surface thereof. By sliding and rotating the second housing to be accommodated into the first housing, two states are realized: a state that operation and speech communication are available; and a state that the operation face is protected with facing in.

Further, in Japanese Unexamined Patent Application Publication No. 2001-24762, a portable telephone apparatus is composed of a main body thereof having a display section provided on one side thereof, and a keypad having operation buttons provided on its surface, which is slidable to cover the display section of the main body therewith. When the main body accommodates the keypad, a part of the display section is exposed from the keypad. When the keypad is slid downward, the entire screen of the display section is exposed. The keypad slides up and down along guide rails provided at both right and left sides of the main body. In the portable telephone apparatus, it is possible to enlarge the displayable screen without injuring the portability and the operability to achieve the displaying of a large amount of information such as mail and data. In the accommodation state, information necessary for audio communication is displayed, and by exposing the entire screen, it is possible to read character information such as mail.

In addition, many slide-type structures, which are adapted so that a movable housing is accommodated within a main housing, have been known. For example, in Japanese Unexamined Patent Application Publication No. 10-271192, a portable phone terminal has been disclosed, in which an operation panel portion having a microphone and a group of dial operation keys can slide into the main body having a speaker and a display. In this portable phone terminal, when being accommodated in the main body, the operation panel section is covered with the main body and therefore cannot be used, preventing it from operating errors. Also, in a slide-type portable terminal of Japanese Unexamined Patent Application Publication No. 9-205476, a main body can be accommodated into the inside of a slidable housing.

In those conventional portable telephone apparatuses, it is necessary to slide two portions into an extended state using both hands to carry out speech communication, resulting in room for improvement of the convenience in use.

In recent years, the portable telephone set has become to be used not only just for speech communication, but also as a portable information terminal having additional functions such as a browser for the Internet or the like, an E-mail transmission/reception and schedule control. Accordingly, since the contents to be displayed include a lot of character information, images and the like, it is desired that the display device is large in size.

Further, a portable telephone having an optical function has been also provided according to the trend of multi-function and high performance. For example, it is mounted with an electronic camera for capturing image data. Furthermore, a portable telephone mounted with a fingerprint recognition system has been provided so that only authorized users can operate the portable telephone itself or identification of a caller can be verified. Such an optical function has an optical aperture section exposed to the outside and any dirt or flaw may prevent it from functioning normally.

SUMMARY OF THE INVENTION

An object of the present invention is to provide a slide-type portable communication apparatus allowing easy operation and enhanced convenience in use.

Another object of the present invention is to provide a slide-type portable communication apparatus allowing an operation section and an optical function section to be protected while enhancing the convenience in use.

According to the present invention, a portable communication apparatus includes: a first unit having at least a display section; a second unit having at least a main operation section; a slide coupling for coupling said first unit with said second unit to be freely slidable in a longitudinal direction between a retracted state and an extended state; an urging member for urging said first unit and said second unit in an extension direction; and a releasable lock mechanism for releasably locking said first unit and said second unit in the retracted state, wherein the locking is released by a predetermined operation.

The main operation section of the second unit is preferably exposed allowing operations of the main operation section when the first unit and the second unit are positioned in the extended state.

The first unit further has a telephone-receiver section and the second unit further has a telephone-transmitter section. The second unit may include: a first housing; and a second housing rotatably coupled to a lower end portion of the first housing, wherein the telephone-transmitter section is provided to the second housing.

The first unit may have an inner space into which the second unit is allowed to slide.

According to the present invention, a portable communication apparatus may include: a first unit having at least a display section and a secondary operation section; a second unit having at least a main operation section; a slide coupling for coupling the first unit with the second unit to be freely slidable in a longitudinal direction between a retracted state and an extended state; an urging member for urging the first unit and the second unit in an extension direction; a releasable lock mechanism for releasably locking the first unit and the second unit in the retracted state, wherein the locking is released by a predetermined operation; and an input operation controller controlling the main operation section and/or the secondary operation section such that an input operation switches between an enabled state and a disabled state when the first and second units are shifted to a predetermined extension state.

The portable communication apparatus may further include: an alert device for alerting by at least one of sound, vibration, light emitting, and displaying; and an alert controller controlling the alert device such that the alert device is driven when an incoming call occurs and is stopped alerting when the first and second units are shifted to a predetermined extension state.

The portable communication apparatus may further include: a call arrival and termination controller controlling such that an operation state of the portable communication apparatus is set to off-hook when an incoming call occurs and the first and second units are shifted to a predetermined extension state for normal communication, and on-hook when the first and second units are shifted to the retracted state after completing communication.

According to another aspect of the present invention, a portable communication apparatus includes: a first unit having at least a display section; a second unit having at least a main operation section; a slide coupling for coupling the first unit with the second unit to be freely slidable in a longitudinal direction between a retracted state and an extended state; and at least one optical function section, each of which has an optical aperture provided in one of surfaces of the first unit and the second unit that face one another in the retracted state, wherein the at least one optical function section is made operable when the first unit and the second unit are positioned in the extended state.

The at least one optical function section may be at least one of a fingerprint authentication device and an electronic image pickup device. The first unit may have an inner space into which the second unit is allowed to slide.

An optical aperture of an electronic image pickup device may be provided on an inner surface of the first unit facing an opposite inner surface thereof, wherein a portion of the opposite inner surface corresponding to the optical aperture of the electronic image pickup device is made of transparent material to allow image pickup operation of the electronic image pickup device.

The portable communication apparatus may further include: an urging member for urging the first unit and the second unit in an extension direction; and a releasable lock mechanism for releasably locking the first unit and the second unit in the retracted state, wherein the locking is released by a predetermined operation.

BRIEF DESCRIPTION OF THE DRAWINGS

FIG. 1A is a side view of a portable telephone apparatus in a retracted state where a front-side unit and a back-side unit overlap one another, according to a first embodiment of the present invention;

FIG. 1B is a plan view of the portable telephone apparatus of FIG. 1A;

FIG. 7A is a flowchart showing a control operation of a touch panel in the second embodiment;

FIG. 7B is a diagram showing an example of a correspondence table between stop positions of the front-side and back-side units and the touch panel enabled area on the display in the second embodiment;

FIG. 8A is a rear view of the portable telephone apparatus in an extended state where the front-side unit and the back-side unit extendedly slide in a longitudinal direction, according to a third embodiment of the present invention;

FIG. 8B is a side view of the portable telephone apparatus of FIG. 8A;

FIG. 8C is a plan view of the portable telephone apparatus of FIG. 8A;

FIG. 9A is a rear view of the portable telephone apparatus in an extended state where the front-side unit and the back-side unit extendedly slide in a longitudinal direction, according to a fourth embodiment of the present invention;

FIG. 9B is a side view of the portable telephone apparatus of FIG. 9A;

FIG. 9C is a plan view of the portable telephone apparatus of FIG. 9A;

FIG. 10A is a side view of the portable telephone apparatus in a retracted state where a front-side unit and a back-side unit overlap one another, according to the fourth embodiment of the present invention;

FIG. 10B is a plan view of the portable telephone apparatus of FIG. 10A;

FIG. 11A is a rear view of a portable telephone apparatus in an extended state where the front-side unit and the back-side unit extendedly slide in a longitudinal direction, according to a fifth embodiment of the present invention;

FIG. 11B is a side sectional view of the portable telephone apparatus of FIG. 9A for explanation of the placement of an optical function section provided in the fifth embodiment;

FIG. 11C is a side view of the portable telephone apparatus of FIG. 11A;

FIG. 11D is a plan view of the portable telephone apparatus of FIG. 11A;

DESCRIPTION OF THE PREFERRED EMBODIMENTS

First Embodiment

Figures 2A, 2B, 2C:
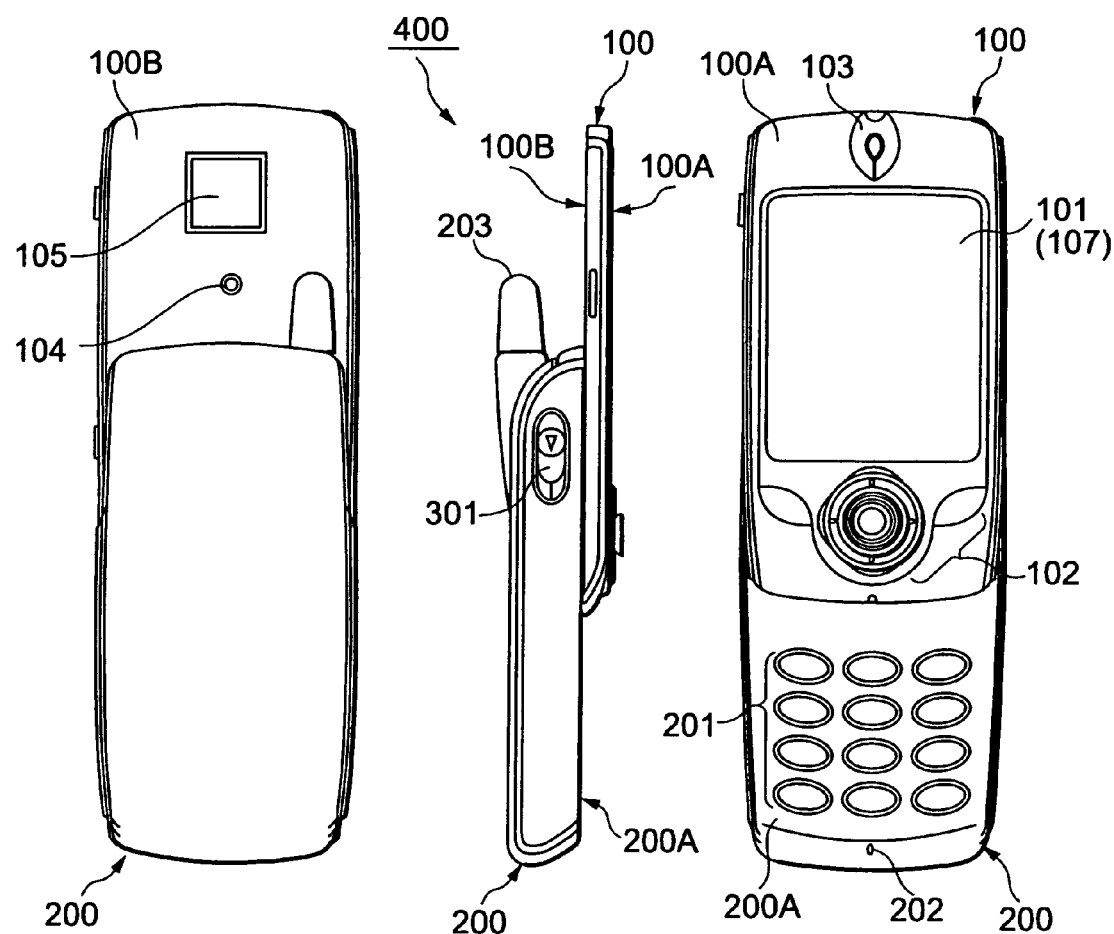
FIG. 2A is a rear view of the portable telephone apparatus in an extended state where the front-side unit and the back-side unit extendedly slide in a longitudinal direction, according to the first embodiment of the present invention.
FIG. 2B is a side view of the portable telephone apparatus of FIG. 2A.
FIG. 2C is a plan view of the portable telephone apparatus of FIG. 2A.

As shown in FIGS. 1A, 1B, and 2A-2C, a portable telephone set according to a first embodiment of the present invention is composed mainly of a front-side unit (first unit) 100 and a back-side unit (second unit) 200, which are connected by a slide mechanism so that they are able to freely sliding in a longitudinal direction. FIGS. 1A and 1B show a retracted state and FIGS. 2A-2C show an extended state. The slide mechanism will be described in FIGS. 3 and 4.

The front-side unit 100 is flat and roughly rectangular in form having a predetermined thickness, and has a first main surface 100A that is a front surface of the front-side unit 100 and a first sub-surface 100B that is a back surface thereof. The front-side unit 100 has a large-size display section (LCD device) 101, a secondary operation section 102 and a receiver section (speaker) 103 provided on the first main surface 100A. On the first sub-surface 100B, the front-side unit 100 has an optical function section provided, for example, an optical aperture section (sensor section) of an electronic image pick-up device (e.g. CCD camera) 104 and a fingerprint recognition section 105 as shown in FIGS. 2A-2C. Further, a magnet 106 is disposed at an appropriate position on the first sub-surface 100B. In the display section 101, a touch panel mechanism 107 may be incorporated.

The back-side unit 200 is flat in form, which has the approximately same shape as the front-side unit 100, and is mounted to the rear side of the front-side unit 100 so as to be freely slidable. A second main surface 200A that is a front surface of the back-side unit 200 has a main operation section 201 and a transmitter section (microphone) 202 provided on the lower portion thereof. A stop-release operation member (one-touch slide button) 301 is provided on one side surface of the back-side unit 200. Within the back-side unit 200, other electronic circuits are accommodated, which will be described later.

Both units 100 and 200 are urged in an extending direction by an urging means 302 disposed within the portable telephone set so as to keep the extended state as shown in FIGS. 2A-2C. In addition, a stop means (locking mechanism) is provided to lock the units 100 and 200 so as to keep the retracted state of the units against the urging means 302. The locking of the stop means can be released by operating the stop-release operation member 301 disposed on one of the side surfaces of the back-side unit 200.

In this embodiment, when the stop-release operation member 301 slides, the lock mechanism of the front-side unit 100 and back-side unit 200 is released to cause the front-side unit 100 to automatically slide upward with respect to the back-side unit 200 by the urging means 302 to set the telephone set in a usable state that the front-side unit 100 and the back-side unit 200 are opened. Instead of sliding the stop-release operation member 301, the stop-release operation member 301 may be depressed to release the lock mechanism.

Figure 3:
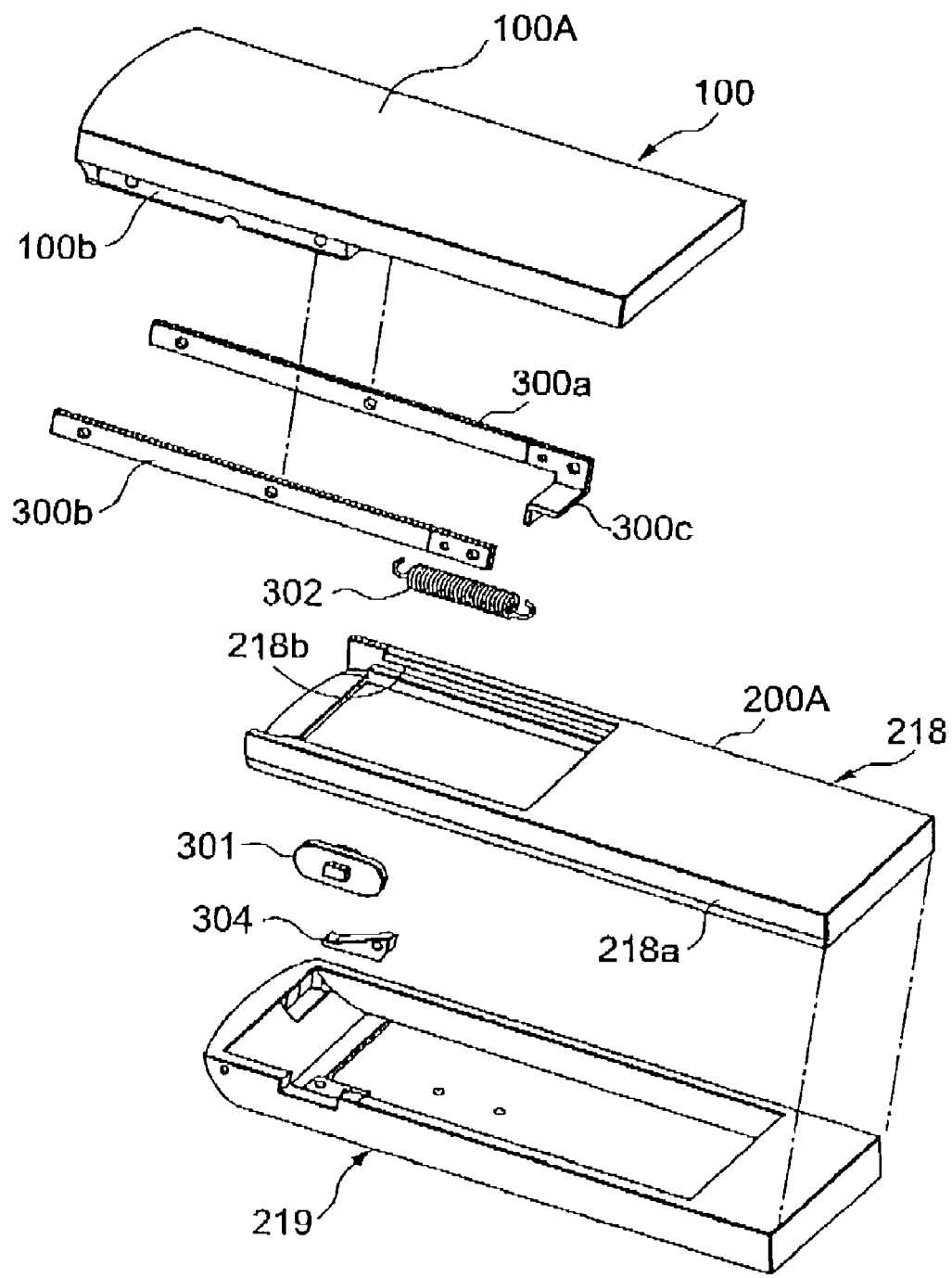
FIG. 3 is an exploded perspective view of a slide mechanism in the first embodiment when viewed from above.
Figure 4:
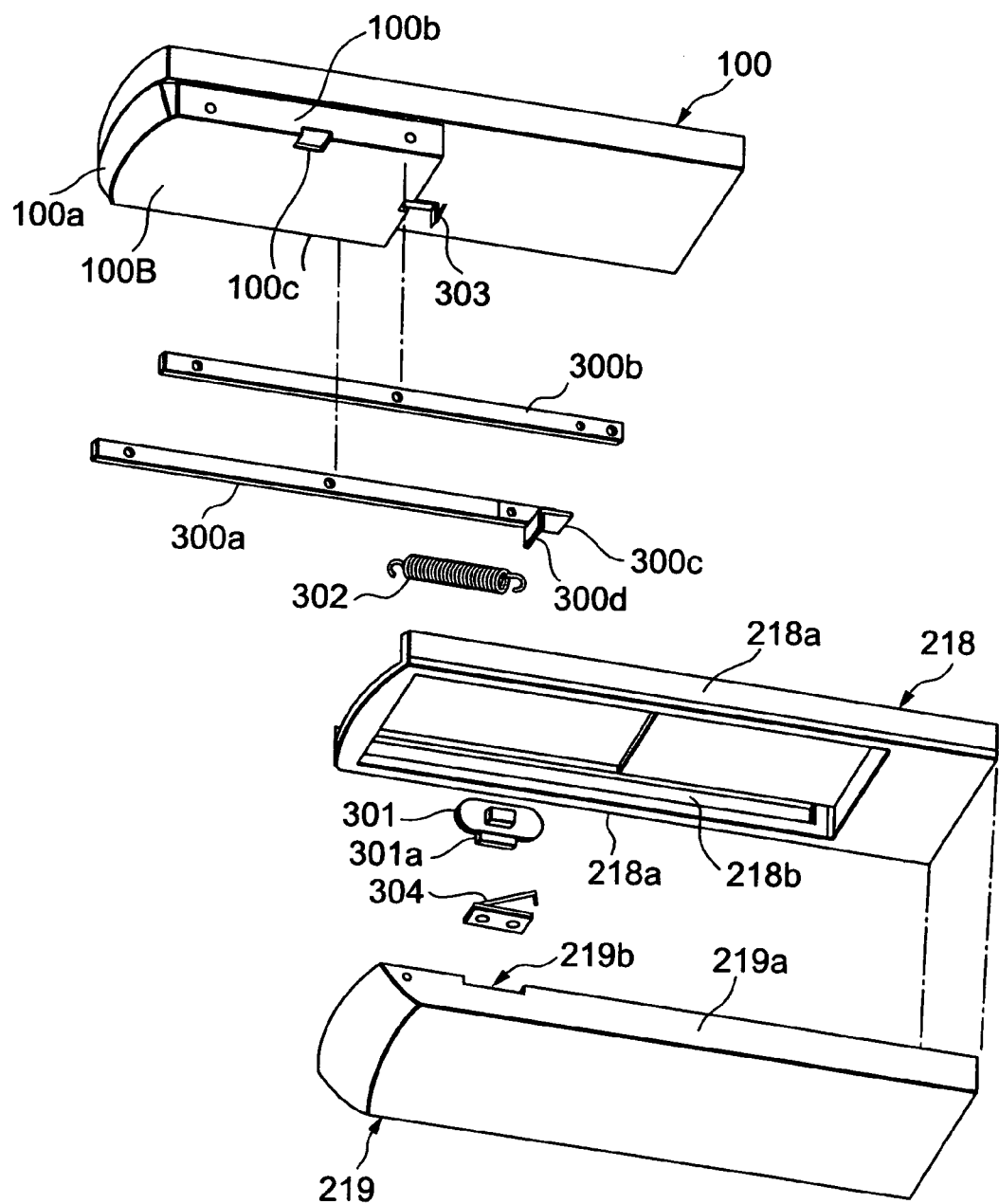
FIG. 4 is an exploded perspective view of the slide mechanism in the first embodiment when viewed from below.

As shown in FIG. 3 and FIG. 4, the upper portion of the front-side unit 100 (left side in the figure) is formed in a swelling shape toward the back-side, and this swelling portion 100a has guide rails 300a and 300b mounted to respective ones of both side surfaces 100b, 100b so that the lower portions the guide rails extend from the swelling portion 100a downwardly (to right direction in the figure). The end of the lower portion of the guide rail 300a has a roughly L-shaped bracket 300c fixed thereto. At the center of the bracket in the axial direction, the edge of the bracket 300c is bent downward in the figure to form an engagement piece 300d. At the central portion of the lower end of the swelling portion 100a, a stop protrusion piece 303 is provided as a stopper in the extension direction. At the center of the one side edge of the swelling portion, a stop recess portion 100c is formed. One end of a coil spring 302 is fixed to the engagement piece 300d, and the other end is fixed to the bottom surface of the back case 219 such that the coil spring 302 is disposed in parallel with the guide rail 300a.

The back-side unit 200 is composed of an intermediate frame 218 and the back case 219 coupled with the intermediate frame 218. Guide grooves 218b and 218b for guiding respective ones of the guide rails 300a and 300b are formed in the inner sides of the respective side walls 218a, 218a of the intermediate frame 218. The lower portion of the front surface of the intermediate frame 218 is provided for the second main surface 200A where the main operation section 201 is formed. The back case 219 has a stop spring 304 of roughly "<"-like shape fixed at the position corresponding to the stop recess portion 100c and, when the units 100 and 200 are retracted, the free end of the stop spring 304 enters into the stop recess portion 100c to restrain the front-side unit 100 from moving in the extension direction. A notch portion 219b is formed in the sidewall 219a of the back case 219 at a position corresponding to the mounting position of the stop spring 304. The stop-release operation member 301 is engaged with this notch portion 219b so as to be slidable by a minute distance in the axial direction. The inwardly protruding piece 301a of the stop-release operation member 301 is adapted so as to come in contact with the upper slope of the stop spring 304, and tension by the stop spring 304 urges the stop-release operation member 301 toward the upper end of the portable telephone set.

The front-side unit 100 and back-side unit 200 are urged in the extension direction by the coil spring 302 at all times. When both units are slid in the retraction direction against the tension of the coil spring 302, the front edge of the free end of the stop spring 304 is inserted into the stop recess portion 100c to restrain both units from moving toward the extension direction, thereby keeping the retracted state. It is more preferable that an appropriate braking means is provided to act in parallel with the coil spring 302, or an appropriate braking element is incorporated into the urging means itself so that the both units slide slowly.

When downwardly sliding the stop-release operation member 301 in the retracted state, the inwardly protruding piece 301a moves while keeping the contact with the upper slop of the stop spring 304 to lower the front edge of the free end of the stop spring 304. When the front edge of the free end of the stop spring 304 is disengaged from the stop recess portion 100c, the tension of the coil spring 302 causes the both units to slide in the extension direction. In this manner, the portable telephone set is automatically extended from the retraction state to the extension state by only sliding the stop-release operation member 301.

In the present embodiment, a magnet 106 (not shown) is disposed at an appropriate portion in the front-side unit 100 in order to determine whether the two units are in the retracted state or in the extended state. On the other hand, a magnetic sensor 210 such as a Hole element or the like is disposed in the back-side unit 200, for example, at the position facing the magnet 106 in the retracted state. Since a predetermined output of the magnetic sensor 210 is obtained by the magnetic field of the magnet 106, the retracted state can be detected.

As described above, when the stop-release operation member is simply slid in the retracted state in which the front-side and back-side units overlap one another as shown in FIGS. 1A and 1B, the front-side unit slides upwardly from the back-side unit into the extended state in which the main operation section is exposed and the space between the microphone and the receiver becomes appropriate as shown in FIGS. 2A-2C, allowing various operation and audio communication.

Next, an electric circuit of the portable telephone according to the present embodiment will be described.

Figure 5:
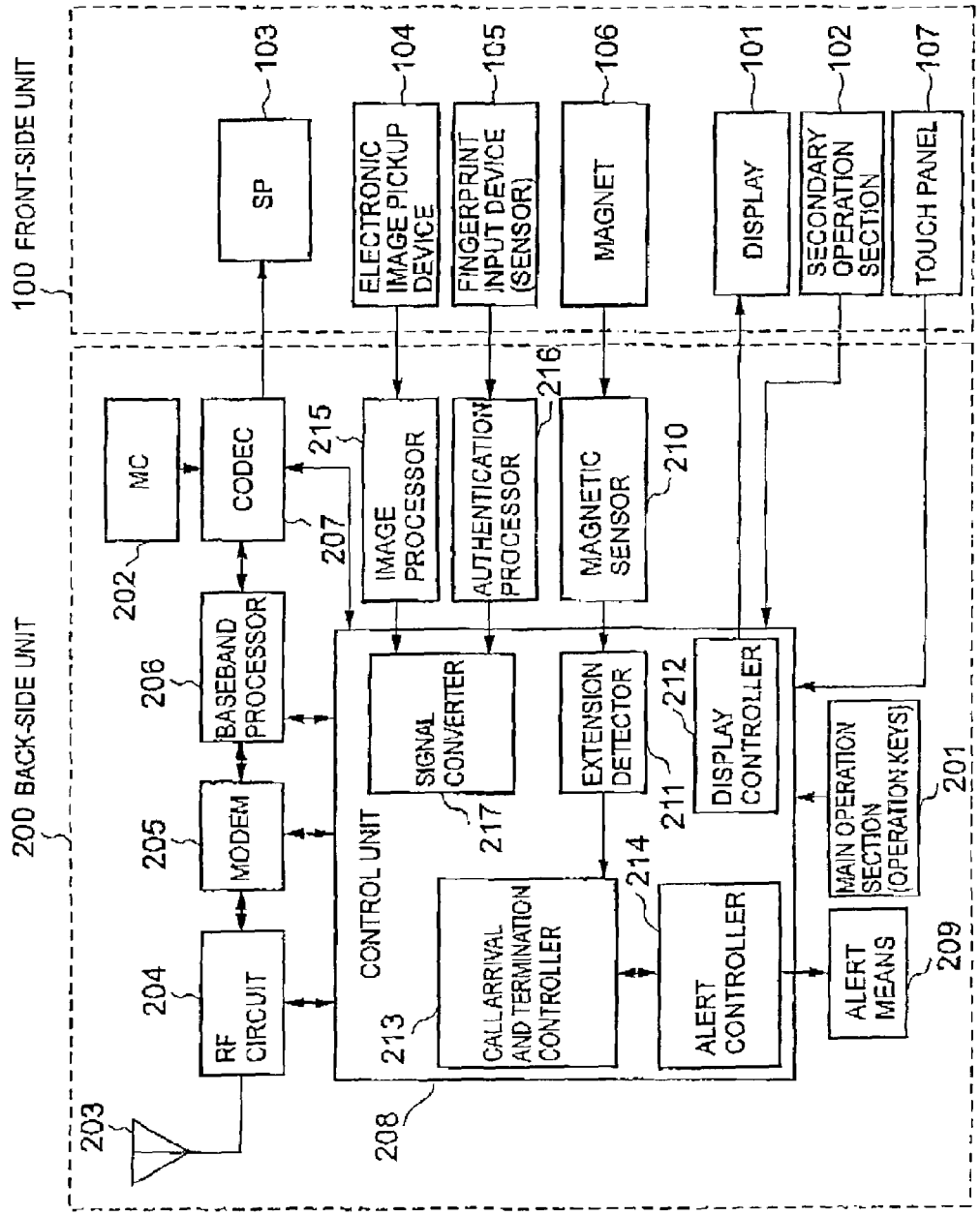
FIG. 5 is a schematic block diagram showing an electric circuit of the portable telephone apparatus according to the first embodiment.

As shown in FIG. 5, the portable telephone according to the present embodiment is structured to include a display section (LCD) 101, a secondary operation section (secondary operation keys) 102, a receiver (speaker) 103, an electronic image pickup device (CCD camera) 104, a fingerprint input device (sensor) 105, a magnet 106 used to detect a relative position of the front-side unit and the back-side unit, and a touch panel 107 incorporated in the display section 101, which are mounted in the front-side unit 100.

In addition, the portable telephone according to the present embodiment is structured to include an antenna 203, an RF circuit 204, a modem 205, a baseband processing circuit 206, a codec circuit 207, a control unit 208, a microphone 202, operation keys 201, a alert means 209, image processor 215, authentication processor 216, and magnetic sensor (Hole element) 210 corresponding to the magnet 106, which are mounted in the back-side unit 200.

The control unit 208 includes a extension detector 211 that detects the retracted/extended state of the units 100 and 200 based on the output of the magnetic sensor 210, a display controller 212 that controls the displaying of the display section 101, a call arrival and termination controller 213 that can carry out a call arrival control operation corresponding to the retracted/extended state of the units 100 and 200, an alert controller 214 that can control a call arrival notification corresponding to the retracted/extended state of the units 100 and 200, and a signal converter 217 that performs conversion of signals from the image processor 215 and the authentication processor 216.

The RF circuit 204 has a receiving circuit, a transmitting circuit, and a frequency synthesizer, which are not shown. The operation keys 201 includes a transmission key, conversion keys for alphabet/Kana/Kanji/numeral, a power source on/off key, a cross key for cursor operation, and an end key. These functional sections are mounted within the back-side unit 200 or on the surface thereof. Each circuit block as shown in FIG. 5 may use a known one and therefore the detailed descriptions will be omitted.

An optical aperture section of the electronic image pickup device 104 disposed on the first sub-surface 100B of the front-side unit 100, an optical aperture section of the fingerprint input device 105 and the operation section 201 of the back-side unit 200 are exposed and operable only when the front-side unit 100 and the back-side unit 200 are extended. Accordingly, only when the front-side unit 100 and the back-side unit 200 are extended, the image capturing and fingerprint input functions can be available and speech communication is further allowed because the microphone and the receiver are appropriately separated from one another.

On the other hand, in the retracted state, the first sub-surface of the front-side unit 100 and the main operation section 201 of the back-side unit 200 faces each other and therefore they are covered with each other. Accordingly, the optical aperture sections of the image pickup device and the fingerprint input device of the main face side unit are protected and the main operation section of the back-side unit 200 is prevented from operating errors.

In this embodiment, the sub-operation section 102 is provided on the first main surface 100A of the front-side unit 100, allow various operations including mail operation, image operation and call arrival operation while confirming visually the displayed contents on the display section in the retracted state.

An operation of the portable telephone according to the embodiment will be described hereinafter.

First, in the case where the portable telephone acts as a telephone, an operation of transmitting and receiving a speech signal will be explained. The antenna 203 receives a radio signal from a base station, and transmits a radio signal. A radio signal received by the antenna 203 is output to a receiving circuit of the RF circuit 204. The receiving circuit selects a signal of a frequency indicated by a frequency synthesizer, and determines whether the selected signal includes a signal notifying of an incoming call to its own terminal (standby reception).

When the receiving circuit has detected a signal that notifies a call arrival to the own terminal, the receiving circuit notifies the call arrival to the control unit 208. The control unit 208 receives the notification from the receiving circuit that there is a call arrival to the own terminal, and drives the alert means 209 such as a beeper, a vibrator and/or a light-emitting diode to notify the user by sound, vibration and/or light blinking of the occurrence of an incoming call to the own terminal.

A user can set the portable telephone to a mode such that, when an incoming call occurs in the retracted state and then the extension detector 211 detects that the front-side unit and the back-side unit are extended in a normal communication position, the call arrival and termination controller 213 automatically sets the operation to an off-hook state to connect the telephone line. In this setting, the reception signal transmitted from a call originating terminal is output to the modem (modem) 205 via the RF circuit 204. At the same time, the call arrival and termination controller 213 instructs the alert controller 214 to stop the alert operation.

Then, the modem 205 demodulates the reception signal to produce a baseband reception signal and output it to the baseband processing circuit 206. The baseband processing circuit 206 processes the baseband reception signal and outputs it to the codec circuit 207. The codec circuit 207 decodes the baseband reception signal to output a sound signal to the speaker (telephone receiver) 103, which outputs sound waves. The codec circuit 207 also encodes a sound signal received by the microphone 202 to output a transmission signal to the baseband processing circuit 206 and the transmission signal is transmitted to the destination through the modem 205 and the RF circuit 204. With this arrangement, the user can carry out communications immediately after the front-side and back-side units have been extended.

This portable telephone is capable of transmitting and receiving character data or graphics data. The portable telephone monitors whether the selected signal includes a signal indicating transmission of character data to its own terminal (standby reception). When character data or graphics data has been received, the control unit 208 automatically receives the transmitted character data without waiting for the off-hook operation, and displays information in the display section 101 based on the received data.

In other words, a signal carrying character data received from the call originating terminal is output to the modem 205 via the RF circuit 204, and is demodulated by the modem 205. The demodulated signal enters the baseband processing circuit 206, which extracts character data from the demodulated signal, to output it to the control unit 208. The display controller 212 of the control unit 208 forms character information or graphic information to be displayed on the display section 101 based on data received from the baseband processing circuit 107. At the same time, the alert controller 214 drives the alert means 209 such as a beeper or a vibrator in a predetermined fashion different from that at the occurrence of an incoming call to notify the user that character data or graphics data has been received.

The control unit 208 includes the CPU, a ROM storing programs, data necessary to process various kinds of processing, and character font data, a RAM used as a work area, a Video RAM to display information on the display section 101, and the display controller 212 that controls the display section 101.

In this portable telephone, the display section 101 is always exposed and therefore the user can loot at character data and graphic data on the display section 101 in the retracted state. Since the secondary operation section 102 is also exposed, character data and graphic data can be seen immediately after they have been received, which allows simple response operations in a compact state where the units 100 and 200 are retracted.

Further, the portable telephone can create message data and transmit it to a destination. In other words, alphabet letters and Katakana characters are allocated to dial operation keys such as 0 to 9, *, and # that are provided on the operation section 201, and these keys include a conversion key for alphabet/Kana/Kanji/numeral conversion. It is possible to input message data and transmit it to a destination designated by the user operating these dial operation keys and the conversion key.

Particularly, in this portable telephone, when character data or graphics data is transmitted or received, it is possible to use the display section 101 as a horizontally oriented display unit if the user wishes. At this time, the display controller 212 displays the display contents on the display section 101 by converting the contents so as to match the direction of the horizontally oriented screen. Further, the processing instructed by a predetermined operation key is appropriately changed so as to match the direction of the horizontally oriented screen.

When the above setting has not been done or when the front-side and back-side units have already been extended at the call arrival time, the telephone line is connected upon the off-hook operation of the user with a communication start key to allow communication.

When the user retracts the front-side and back-side units to the retracted state after termination of the conversation, the extension detector 211 detects this position change, and the call arrival and termination controller 213 automatically sets the operation state to the on-hook state (communication termination processing). Of course, the same communication termination can be made by the user operating a predetermined termination key for off-hook in the normal communication position.

As described above, the portable telephone according to the present embodiment can provide the following advantages. Since the front-side unit having the display section and the back-side unit having the operation section overlap one another in the retracted state, both large-size display and the downsizing can be achieved. When retracted such that the operation section is covered with the front-side unit, the display section and the secondary operation section is always exposed and therefore it is possible to carry it in compact while looking at a map or the like on the screen, and further prompt operations of a map, a game or the like are allowed without extending the portable telephone.

When the portable telephone is retracted, it is possible to carry the portable telephone with protecting the operation section, preventing it from operating errors. Further, the optical function sections of the CCD camera and the fingerprint input device can be also protected.

As described before, a one-touch sliding operation of the stop-release operation member allows the portable telephone to be changed from the retracted state to the extended state. Accordingly, the normal use state can be obtained by operating a single button without using both hands every time, resulting in enhanced convenience in use.

Furthermore, it is possible to change display contents or switch the function of an operation key (soft-key) so as to meet the detected extended/retracted state of both units. When a call arrives in the retracted state, the extended state is obtained by only a slide operation of the stop-release operation member, and at the same time, the off-hook operation is automatically performed, resulting in prompt response operations to the call arrival and increased convenience in use. When the portable telephone is retracted after completing communication, the call termination is automatically performed. This also allows increased convenience in use.

In the present embodiment, although the stop-release operation member is provided to the back-side unit, it may be provided to the front-side unit. In this case, by operating the stop-release operation member, the back-side unit having the operation section slides downward with respect to the front-side unit having the display section and the main operation section is exposed to the outside, allowing operations by operation keys. In addition, the distance between the microphone and the receiver is suitable for speech communication.

Second Embodiment

A portable telephone according to a second embodiment of the present invention has the substantially same structure as the first embodiment as shown in FIGS. 1A, 1B, and 2A-2C. Since the shape and the retraction/extension operation of the portable telephone are the same as those of the first embodiment, their descriptions will be omitted.

Figure 6:
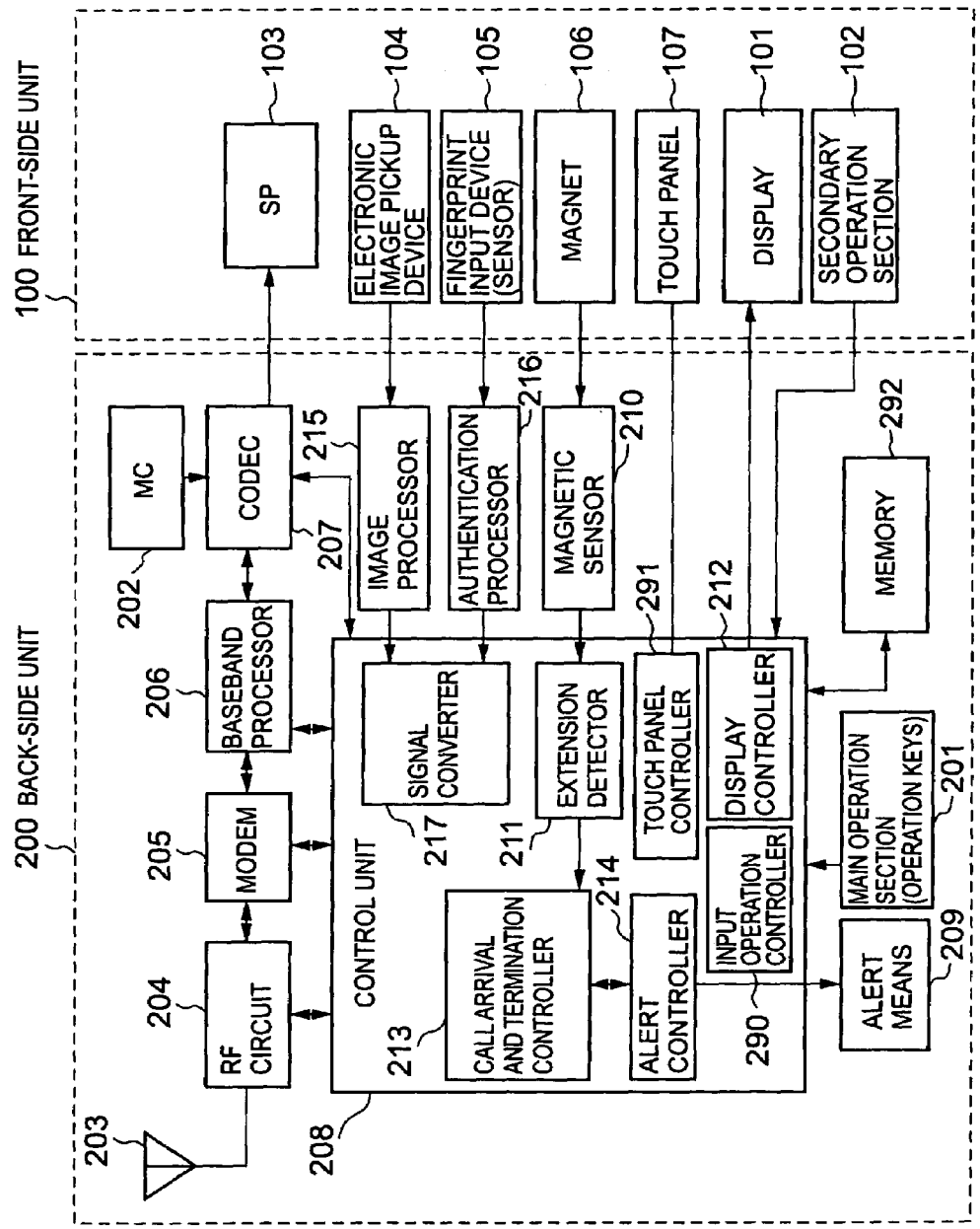
FIG. 6 is a schematic block diagram showing an electric circuit of the portable telephone apparatus according to a second embodiment of the present invention.

As shown in FIG. 6, the second embodiment is characterized by an input operation controller 290 and a touch panel controller 291. The input operation controller 290 enables or disables the input operation with the operation section. The touch panel controller 291 enables or disables the touch panel function of the touch panel 107. A memory (RAM) 292 is further provided to store setting data. The other blocks are similar to those of the first embodiment and therefore. Accordingly, the other blocks similar to those described in FIG. 5 are denoted by the same reference numerals and the descriptions of the other blocks and the slide mechanism will be omitted.

In the present embodiment, when a slide operation between the front-side unit 100 and the back-side unit 200 is detected by a combination of the magnet 106, the magnetic sensor 210 and the extension detector 211, the input operation controller 290 switches the input operation of the main operation section and/or the secondary operation section between the disabled state and the enabled state. In other words, the function control state is changed depending on a slide stop position. When a slide operation between the front-side unit 100 and the back-side unit 200 is detected, the touch panel controller 291 switches the touch panel function of the display section 101 and the touch panel 107 between the disabled state and the enabled state.

As for the control of the touch panel function, the entire panel face may simply switch between enabled and disabled states. In the present embodiment, a plurality of slide stop positions of the front-side unit 100 and the foregoing back-side unit 200 are previously provided, and the touch panel controller 291 may increase/decrease the enabled area of the touch panel function on the display section 101 depending on a slide stop position of the front-side unit 100 and the foregoing back-side unit 200. More specifically, the touch panel function on the full screen of the display section 101 is enabled or disabled on the basis of a predetermined area. An example of the control of the touch panel controller 291 will be described with reference to FIGS. 7A and 7B.

As shown in FIG. 7B, the memory (RAM) 292 previously stores the settings of a touch panel function enabled area on the display section 202, the settings each corresponding to an closed (retracted) state, a half-open state, and an open (extended) state of the stop position between the front-side unit 100 and the back-side unit 200. For example, depending on which is set: the closed state; half-open state; or open state, full-screen, one-third, or one-fifth of the lower portion of the display section is set to a touch panel function enabled area.

As shown in FIG. 7A, the control unit 208 monitors sensor output of the magnetic sensor to detect a current slide position of the front-side and back-side units (step S101). When the current position has been detected (YES at step S101), it is determined whether the detected position is a stop position (1) (step S102). When it is the stop position (1) (YES at step S102), a touch panel enabled area is changed to the setting (1) indicating the full screen (step S104). When it is not the stop position (1) (NO at step S102), it is determined whether the detected position is a stop position (2) (step S103). When it is the stop position (2) (YES at step S103), a touch panel enabled area is changed to the setting (2) indicating one-third of the lower portion of the display section (step S105). When it is not the stop position (2) (NO at step S103), a touch panel enabled area is set to the setting (3) indicating one-fifth of the lower portion of the display section (step S106).

In this manner, the touch panel enabled area of the display section 101 is set to a selected one of full-screen, one-third, or one-fifth of the lower portion of the display section depending on which one of the plurality of stop positions is detected. The enabled area may be expressed as a number of rows in a predetermined character size display, instead of a zone (area) of the display section. The settings stored in the memory (RAM) 292 may be arbitrarily determined by a user. According to the present embodiment, a slide operation of the front-side and back-side units allows control of the touch panel function, key locking function, and other functions, resulting in enhanced convenience in use.

Third Embodiment

As shown in FIGS. 8A-8C, a portable telephone set 400A according to a third embodiment of the present invention has the almost same structure as the above described first embodiment, provided that an electronic image pick-up device (CCD camera) 104 is mounted as an optical function section on a back-side unit 200 and it's optical aperture section is formed in the front surface (second main surface) 200A of the back-side unit 200, and a video telephone function is added to the electric circuit.

The other members are the same as those of the first embodiment. Therefore, in the retracted state in which the front-side unit 100 and the back-side unit 200 overlap one another, the external appearance is the same as that previously shown in FIGS. 1A and 1B. The structure of each unit, the slide mechanism, the electric circuit and the like will be omitted to avoid overlaps.

In the third embodiment, the optical aperture section of the electronic image pick-up device (CCD camera) 104 is formed in the front surface (second main surface) 200A of the back-side unit 200. When extended (in use state), the main operation section 201 on the second main surface 200A and the display section 101 provided to the first main surface 100A of the front-side unit 100 are all disposed in the front-side. Therefore, all of the electronic image pick-up device (CCD camera) 104, the main operation section 201 and the display section 101 face to the front-side (user-side). This results in a further advantage of allowing a video telephone communication or video telephone conference using the present portable telephone.

Fourth embodiment

A fourth embodiment of the present invention will be described with reference to FIGS. 9A-9C and FIGS. 10A and 10B.

A portable telephone set 400' according to the present embodiment is composed of two units: a first unit 100' shaped like a hollow sheath having an opening directed downward and is provided with a display section and the like on its surface; and a second unit 200' provided with a main operation section and the like, which can be accommodated within the hollow space of the first unit 100'. These units 100' and 200' are coupled via an appropriate slide mechanism so as to be freely slidable in the longitudinal direction.

The first unit 100' is flat and roughly rectangular in form having a predetermined thickness, and has a first main surface 100A that is a front surface of the first unit 100' and a first sub-surface 100B that is a back surface thereof. The first unit 100' has a display section (LCD device) 101, a secondary operation section 102 and a receiver section (speaker) 103 provided on the first main surface 100A. A stop-release operation member (one-touch slide button) 301' is provided on one side surface of the first unit 100'. Further, a magnet 106 is disposed at an appropriate position on the first sub-surface 100B. In the display section 101, a touch panel mechanism 107 may be incorporated as necessary.

The second unit 200' allowed to be accommodated into the first unit 100' is shaped like a flat box corresponding to an inner space of the first unit 100' and is mounted so as to be slidable into the inner space of the first unit 100'. A second main surface 200A that is a front surface of the second unit 200' has a main operation section 201 and a transmitter section (microphone) 202 provided on the lower portion thereof. On a second sub-surface 200B opposite to the second main surface 200A, the second unit 200' has an optical function section provided, for example, optical aperture sections (sensor sections) of an electronic image pick-up device (e.g. CCD camera) 104' and a fingerprint input device 105' as shown in FIG. 9A.

Both units 100' and 200' are urged in an extending direction by an urging means (not shown) disposed within the portable telephone set so as to keep the extended state as shown in FIGS. 9A-9C. In addition, a stop means (locking mechanism) is provided to lock the units 100' and 200' so as to keep the retracted state of the units against the urging means. The locking of the stop means can be released by operating the stop-release operation member 301' disposed on one of the side surfaces of the first unit 100'.

In this embodiment, when the stop-release operation member 301' slides, the lock mechanism of the first unit 100 and second unit 200 is released to cause the first unit 100 to automatically slide upward with respect to the second unit 200 by the urging means to set the telephone set in a usable state that the first unit 100 and the second unit 200 are opened. Instead of sliding the stop-release operation member 301', the stop-release operation member 301' may be depressed to release the lock mechanism.

The portable telephone according to the present embodiment has the same function sections as those of the electric circuit as shown in FIG. 5. The first unit 100' includes the display section (LCD) 101, the touch panel 107, the secondary operation section 102, the receiver (speaker) 103, the inner magnet 106 and further includes an antenna 203, an RF circuit 204, a modem 205, a baseband processing circuit 206, a codec circuit 207, a control unit 208, an alert means 209 and the like. The second unit 200' includes the main operation section 201 and the microphone 202 on the second main surface 200A and the electronic image pickup device (CCD camera) 104' and the fingerprint input device (sensor) 105' on the second sub-surface 200B.

The units 100' and 200' are coupled with each other so as to be freely slidable in the axial direction by the slide mechanism. Operating the main operation section 201 and speech communication can be carried out in the extended state that the second unit 200' is pulled out from the first unit 100'. When the second unit 200' slides into the first unit 100' (in the retracted state), the main operation section 201 and the optical aperture sections of the electronic image pick-up device 104' and the fingerprint recognition section 105' are covered with the back surface of the first unit 100' and thereby protected. As described above, the portable telephone set according to the present embodiment has the same advantages as those of the first embodiment.

In the portable telephone set according to the present embodiment, it may be adapted so that the optical aperture section of the electronic image pick-up device (CCD camera) 104' is mounted on the front surface (second main surface) 200A of the second unit 200' and a video telephone function is implemented in the electric circuit as in the case of the third embodiment.

Fifth embodiment

Referring to FIGS. 11A-11D, a portable telephone set 400B according to a fifth embodiment of the present invention has a structure similar to that of the above-described fourth embodiment, and only the following two points are different. First, an electronic image pick-up device (CCD camera) 104, which is the optical function section, is provided in an inside surface (first sub-surface) 100B that faces the inner space and is opposite to the first main surface 100A of the first unit 100'. Second, a light transmission section 100b is formed in a back surface section 100C of the sheath-like unit 100' at a position corresponding to the electronic image pick-up device (CCD camera) 104.

The other portions are the same as those of the fourth embodiment. Accordingly, in the retracted state in which the first unit 100' and the second unit 200' overlap one another, the external appearance is the same as shown in FIG. 10. The structure of each unit, the slide mechanism, the electric circuit and the like will be omitted to avoid overlaps.

The light transmission section 100b of the portable telephone set 400B is a through hole that is formed at a predetermined position of the back-face section 100C and is slightly larger than the aperture section of the CCD camera 104. In the present embodiment, as shown in FIG. 11B, in the extended state (usable state) that the second unit 200' has popped out from the first unit 100', light from outside transmits through the light transmission section 100b and enters into the aperture section of the CCD camera 104' and therefore the CCD camera 104 captures an image, which can be utilized. On the other hand, when both units are slid into a retracted state, the second unit 200' is accommodated within the first unit 100', the aperture section of the CCD camera 104 is covered and protected by the second unit 200'.

As for the light transmission section 100b, at least the relevant portion of the back-face section 100C may be formed using a transparent material, or may be realized by providing a transparent protection plate to the relevant portion. Such a structure further increases the air tightness and thereby the entry of any foreign matter such as dust into the inside space is prevented, which is further preferred. As for the light transmission section 100b, if the light from outside is allowed to transmit, any structure may be adopted.

The fifth embodiment also has various advantages as above mentioned, for example, a one-action of operating the stop-release operation member 301' while holding the portable telephone set by one hand can extend the portable telephone set into the usable state. In particular, the protection performance of the CCD camera 104 becomes higher.

Sixth Embodiment

A sixth embodiment of the present invention will be described with reference to FIGS. 12A-12C and FIG. 13.

Figure 12A:
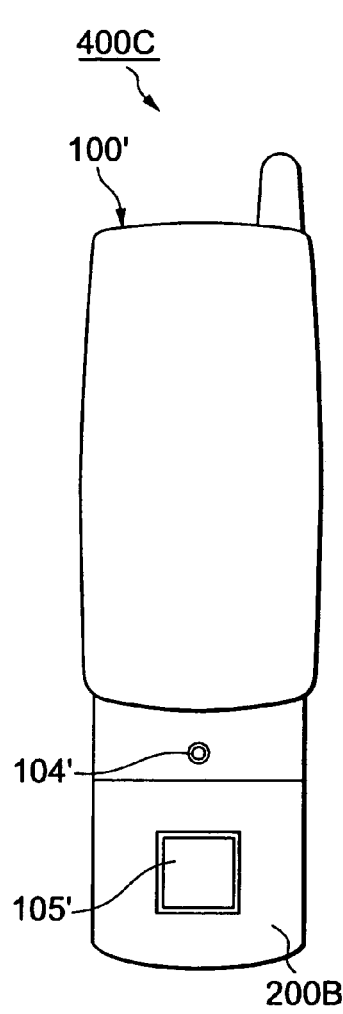
FIG. 12A is a rear view of the portable telephone apparatus in an extended state where the front-side unit and the back-side unit extendedly slide in a longitudinal direction, according to a sixth embodiment of the present invention.
Figure 12B:
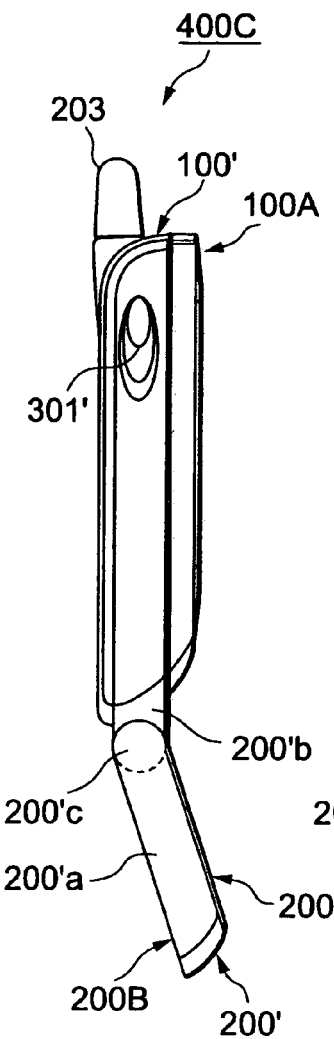
FIG. 12B is a side view of the portable telephone apparatus of FIG. 12A.
Figure 12C:
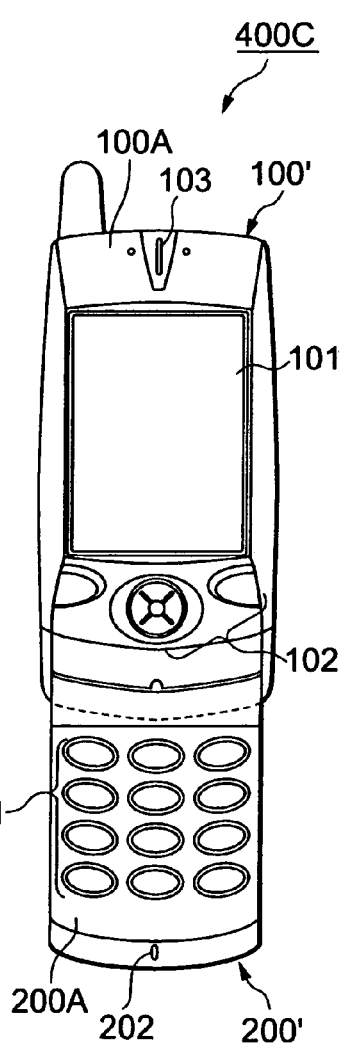
FIG. 12C is a plan view of the portable telephone apparatus of FIG. 12A.

As shown in FIGS. 12A-12C, a portable telephone set according to the sixth embodiment of the present invention has the similar structure to the above fourth and fifth embodiments and is composed mainly of a first unit 100' having a display device 101 and a speaker 103, a second unit 200' that has a microphone 202 and is engaged with the first unit 100', and a slide engagement means for engaging the first unit 100' with the second unit 200' so as to be freely slidable in the longitudinal direction. In particular, the second unit 200' is provided with an upper first housing 200'b and a second housing 200'a that has the microphone 202 and is rotatably coupled to the first housing 200'b. A rotation structure 200'c, which rotatably couples the first housing 200'b and the second housing 200'a, can employ any known structure. As shown in FIG. 12B, the second housing 200'a can rotate around the rotation structure 200'c to make the second unit 200' bent at a predetermined angle.

Figure 13:
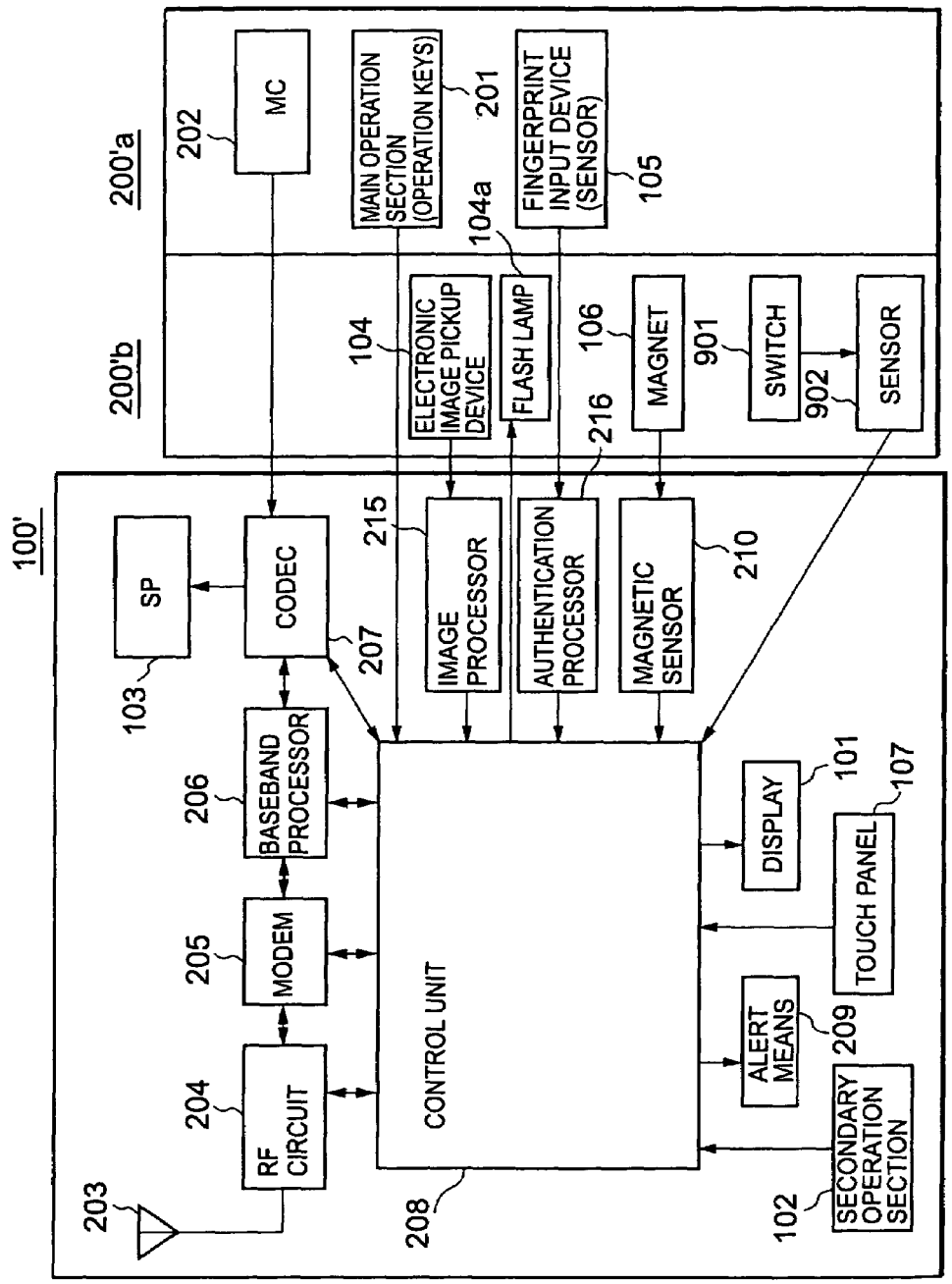
FIG. 13 is a schematic block diagram showing an electric circuit of the portable telephone apparatus according to the sixth embodiment.

As shown in FIG. 13, the portable telephone set according to the present embodiment includes an electric circuit within the first unit 100' and the second unit 200' composed of the second housing 100'a and the first housing 200'b. The control unit 208 includes an extension detector (not shown) for detecting that the first unit 100' and the second unit 200' are in the extended state by using a magnet 106 and a magnetic sensor 210, a rotation detector (not shown) for detecting that the first housing 200'b and the second housing 100'a of the second unit 200' are in the rotated state by using a switch 901 and a sensor 902, and a function controller (not shown). In the control unit 208, when the extension detector detects the extended state between the first unit 100' and the second unit 200', a predetermined function is made enabled or disabled. When the rotation detector detects the rotated state between the first housing 200'b and the second housing 200'a of the second unit 200', a predetermined function can be made enabled or disabled. Further, the control unit 208 is also provided with other functions similar to those previously described in hitherto embodiments. The function controller acts as the above-described input operation controller as well and, based on the extended state between the first unit 100' and the second unit 200', determines whether the input operation via the main operation section and/or the sub-operation section is made enabled.

A desired function control of the function controller can be set depending on the setting. For example, the rotation detector may perform an off-hook operation when detecting a shift from the straight state to the rotated state (see FIG. 12B) between the first housing 200'b and the second housing 200'a of the second unit 200' at call arrival; and perform call termination when detecting a shift from the rotated state to the straight state between the first housing 200'b and the second housing 200'a of the second unit 200 after completing the communication. In addition, it is possible to make an alert reduction/mute function or a response holding function operate at the call arrival as a first function in the extended state, and make the off-hook or response hold-release function operate as a second function in the rotated state. Furthermore, it is possible to set the camera image pickup function as a first function, or the flash function at picking-up as a second function. As described above, the portable telephone set according to the present embodiment has, in addition to the previously described advantages, another advantage such that the touch panel function, the key locking function and other functions can be controlled depending on a state made by a slide operation between the first unit and the second unit and/or a bent state made by rotation between the first housing and the second housing, resulting in increased convenience in use.

The above-described embodiments have been described taking as an example the case where both of the electronic image pick-up device and the fingerprint input device are provided as the optical function section. Needless to say, the portable telephone may be provided with either the electronic image pick-up device or the fingerprint input device. In the present invention, the other components are not limited to the above-described embodiments. Various modifications may be possible without the scope of the present invention; for example, an EL display device is utilized for the display device in place of the LCD.

According to the present invention, the following advantages are obtained. Since the first unit having the display section and the second unit having the main operation section overlap one another when retracted, up sizing of display screen and downsizing of the telephone set are compatible. Even in the retracted state that the main operation section is accommodated, the display section and the secondary operation section are always exposed allowing easy operation thereof. Accordingly, it is possible to carry around the portable telephone set compactly while watching the display section, and thereby referring to a map or operating a game or the like can be carried out immediately.

In the retracted state, the main operation section is protected and prevented from operating errors. Also, in the case where optical function sections such as a camera and a fingerprint input device are provided, these sections are also accommodated and protected as described before.

Only a sliding operation of the stop-release operation member causes the portable telephone set to slide from the retracted state to the extended state. In other words, the usable state can be obtained by a simple operation of a single button (by one-touch), without extending by using both hands every time, resulting in increased convenience in use.

It is possible to detect the extended/retracted state of both units and display content or a function of an operation key (soft-key) can switch depending on a detected state. When a call arrives in the retracted state, the extended state is obtained by sliding operation only of the stop-release operation member and, at the same time, an off-hook operation is carried out automatically, resulting in prompt response to an incoming call and therefore increased convenience in use. When detecting a shift from the extended state to the retracted state after completing communication, call termination is carried out automatically, resulting in increased convenience in use.

The invention claimed is:

1. A portable communication apparatus comprising:
a first unit including a display section;
a second unit including a main operation section;
a slide coupling that couples said first unit with said second unit such that said first and second units are freely slidable in a longitudinal direction between a retracted state and an extended state;
a coil spring urging member that urges said first unit away from said second unit in an extension direction toward said extended state; and
a releasable lock mechanism that releasably locks said first unit and said second unit in the retracted state, the lock mechanism being releasable by a predetermined operation;
wherein said releasable lock mechanism comprises a stop spring on said second unit that engages a stop recess portion within said first unit, wherein a stop-release operation member biases said stop spring to be released from said stop recess portion in the retracted state to thereby cause said first unit to slide in the longitudinal direction toward the extended state.

2. The portable communication apparatus according to claim 1, wherein said main operation section of said second unit is exposed allowing operations of said main operation section when said first unit and said second unit are positioned in the extended state.

3. The portable communication apparatus according to claim 2, wherein said first unit further includes a secondary operation section.

4. The portable communication apparatus according to claim 3, wherein said secondary operation section comprises a touch panel mounted on said display section.

5. The portable communication apparatus according to claim 1, wherein said first unit further includes a telephone-receiver section and said second unit further includes a telephone-transmitter section, wherein said second unit comprises:
a first housing; and
a second housing rotatably coupled to a lower end portion of the first housing, wherein said telephone-transmitter section is provided to the second housing.

6. The portable communication apparatus according to claim 5, wherein said first unit includes an inner space into which said second unit that is in a straight state is allowed to slide.

7. The portable communication apparatus according to claim 5, further comprising:
a bending detector that detects a bent state of said first housing and said second housing of said second unit.

8. The portable communication apparatus according to claim 5, wherein said first unit further includes a secondary operation section, and
said portable communication apparatus further comprises:
a bending detector that detects a bent state of said first housing and said second housing of said second unit;
an extension detector that detects an extension state of said first unit and said second unit; and
an input operation controller controlling at least one of said main operation section and said secondary operation section such that an operation of at least one of said main operation section and said secondary operation section is changed depending on at least one of the bent state detected by said bending detector and the extension state detected by the extension detector.

9. The portable communication apparatus according to claim 5, wherein said first unit further includes a secondary operation section, and
said portable communication apparatus further comprises:
a bending detector that detects a bent state of said first housing and said second housing of said second unit.

10. The portable communication apparatus according to claim 9, further comprising:
an input operation controller controlling at least one of said main operation section and said secondary operation section such that an input operation is one of enabled and disabled depending on the bent state detected by said bending detector.

11. The portable communication apparatus according to claim 10, wherein said input operation controller further changes an operation of at least one of said main operation section and said secondary operation section depending on the bent state detected by said bending detector.

12. The portable communication apparatus according to claim 5, further comprising:
a bending detector that detects a bent state of said first housing and said second housing of said second unit; and
a function controller enabling a predetermined function when the bending detector detects a predetermined bent state of said first housing and said second housing.

13. The portable communication apparatus according to claim 12, wherein said function controller disables said predetermined function when the bending detector detects another predetermined bent state of said first housing and said second housing.

14. The portable communication apparatus according to claim 1, wherein said first unit further includes a secondary operation section.

15. The portable communication apparatus according to claim 14, wherein said secondary operation section comprises a touch panel mounted on said display section.

16. The portable communication apparatus according to claim 15, further comprising:
an extension detector that detects an extension state of said first unit and said second unit; and
a touch panel controller controlling said touch panel such that a touch panel function is one of enabled and disenabled depending on the extension state detected by the extension detector.

17. The portable communication apparatus according to claim 15, further comprising:
an extension detector that detects one of a plurality of extension states of said first unit and said second unit; and
a touch panel controller controlling said touch panel such that an enabled area of a touch panel function is changed depending on which one of said plurality of extension states is detected by the extension detector.

18. The portable communication apparatus according to claim 17, wherein said touch panel controls such that an enabled area of said touch panel function is set to a maximum area when the extension state is the retracted state and a minimum area when it is the extended state.

19. The portable communication apparatus according to claim 14, further comprising:
an extension detector that detects an extension state of said first unit and said second unit.

20. The portable communication apparatus according to claim 14, further comprising:
an input operation controller controlling at least one of said main operation section and said secondary operation section such that an input operation is one of enabled and disabled depending on the extension state detected by said extension detector.

21. The portable communication apparatus according to claim 1, wherein said first unit includes an inner space into which said second unit is allowed to slide.

22. The portable communication apparatus according to claim 1, further comprising:
an extension detector that detects an extension state of said first unit and said second unit.

23. The portable communication apparatus according to claim 22, wherein said extension detector comprises:
a magnetic field generator provided at at least one predetermined position in one of said first unit and said second unit;
a magnetic field detector provided at a predetermined position in the other of said first unit and said second unit; and
an extension determiner that determines the extended state of said first unit and said second unit based on a detection signal of said magnetic field detector.

24. The portable communication apparatus according to claim 22, further comprising:
an input operation controller controlling said main operation section such that an input operation is one of enabled and disabled depending on the extension state detected by said extension detector.

25. The portable communication apparatus according to claim 1, further comprising:
an alert device that alerts by at least one of sound, vibration, light emitting, and displaying; and
an alert controller controlling said alert device such that said alert device is driven when an incoming call occurs and is stopped alerting when said first and second units are shifted to a predetermined extension state.

26. The portable communication apparatus according to claim 1, further comprising:
a call arrival and termination controller controlling such that an operation state of said portable communication apparatus is set to off-hook when an incoming call occurs and said first and second units are shifted to a predetermined extension state for normal communication, and on-hook when said first and second units are shifted to the retracted state after completing communication.

27. The portable communication apparatus according to claim 1, wherein said first unit covers said main operating section of said second unit when said slide coupling is in said retracted state, and said first unit uncovers said main operating section of said second unit when said slide coupling is in said extended state.

28. The portable communication apparatus according to claim 1, wherein said urging member comprises an extension coil spring.

29. The portable communication apparatus according to claim 1, wherein a first end of said urging member is attached to said first unit and a second end of said urging member is attached to said second unit.

30. A portable communication apparatus comprising:
  a first unit including a display section and a secondary operation section;
  a second unit including a main operation section;
  a slide coupling that couples said first unit with said second unit such that said first and second unit are freely slidable in a longitudinal direction between a retracted state and an extended state;
  a coil spring urging member that urges said first unit away from said second unit in an extension direction toward said extended state;
  a releasable lock mechanism that releasably locks said first unit and said second unit in the retracted state, the lock mechanism being releasable by a predetermined operation; and
  an input operation controller controlling said main operation section and/or said secondary operation section such that an input operation switches between an enabled state and a disabled state when said first and second units are shifted to a predetermined extension state,
  wherein said releasable lock mechanism comprises a stop spring on said second unit that engages a stop portion on said first unit, wherein a stop-release operation member biases said stop spring to release from said stop portion in the retracted state to thereby cause said first unit to slide in the longitudinal direction toward the extended state.

31. The portable communication apparatus according to claim 30, wherein said first unit covers said main operation section of said second unit when said slide coupling is in said retracted state, and said first unit uncovers said main operation section of said second unit when said slide coupling is in said extended state.

32. A portable communication apparatus comprising:
  a first unit including a display section;
  a second unit including a main operation section;
  a slide coupling that couples said first unit with said second unit such that said first and second units are freely slidable in a longitudinal direction between a retracted state and an extended state;
  a coil spring urging member that urges said first unit away from said second unit in an extension direction toward said extended state; and
  a releasable lock mechanism that releasably locks said first unit and said second unit in the retracted state, the lock mechanism being releasable by a predetermined operation,
  wherein said releasable lock mechanism comprises a stop spring on said second unit that engages a stop portion on said first unit, wherein a stop-release operation member biases said stop spring to release from said stop portion in the retracted state to thereby cause said first unit to slide in the longitudinal direction toward the extended state.

* * * * *